United States Patent [19]

Takakusagi et al.

[11] Patent Number: 4,487,549
[45] Date of Patent: Dec. 11, 1984

[54] APPARATUS FOR CONTROLLING OPERATION OF HYDRAULIC MACHINE

[75] Inventors: Tsunehiko Takakusagi; Keizo Kikuchi, both of Hitachi, Japan

[73] Assignee: Hitachi, Ltd., Tokyo, Japan

[21] Appl. No.: 388,710

[22] Filed: Jun. 15, 1982

[30] Foreign Application Priority Data

Jun. 17, 1981 [JP] Japan ................. 56-92253

[51] Int. Cl.³ ............................................. F01D 17/06
[52] U.S. Cl. ........................................ 415/30; 415/1; 415/500
[58] Field of Search ................. 415/1, 30, 38, 40, 43, 415/50, 149 R, 149 A, 146, 500

[56] References Cited

U.S. PATENT DOCUMENTS

| | | | |
|---|---|---|---|
| 2,613,500 | 10/1952 | Lysholm | 415/149 |
| 3,052,252 | 9/1962 | Laucks et al. | 415/43 |
| 3,669,559 | 6/1972 | Sakamoto | 415/43 |
| 3,709,626 | 1/1973 | Eggenberger | 415/17 |
| 3,723,018 | 3/1973 | Uchiyama et al. | 415/38 |
| 3,859,006 | 1/1975 | Randell | 415/17 |
| 4,014,624 | 3/1977 | Takase et al. | 415/500 |
| 4,228,753 | 10/1980 | Davis et al. | 415/115 |

FOREIGN PATENT DOCUMENTS

| | | | |
|---|---|---|---|
| 47908 | 8/1979 | Fed. Rep. of Germany | 415/26 |
| 48103 | 3/1981 | Fed. Rep. of Germany | 415/500 |

Primary Examiner—Charles E. Phillips
Assistant Examiner—John Kwon
Attorney, Agent, or Firm—Beall Law Offices

[57] ABSTRACT

An apparatus for controlling the operation of a hydraulic machine such as a multi-stage pump turbine having a plurality of runners mounted on a common shaft and guide vanes arranged around respective runners to adjust the flow rate of water supplied to respective runners. The controlling apparatus has a speed detection means for detecting the speed of the hydraulic machine, comparator means for comparing the detected speed signal with a speed command to produce a stroke signal in accordance with a speed deviation signal obtained through the comparison, driving means for opening and closing the guide vanes associated with any selected runner in accordance with the stroke signal, and connecting means for connecting the stroke signal generating means to the driving means for the guide vanes associated with the other runner or runners in such a manner that a predetermined relationship is maintained between the opening degree of the guide vanes of the selected runner and the opening degree or degrees of the guide vanes associated with other runner or runners.

27 Claims, 4 Drawing Figures

APPARATUS FOR CONTROLLING OPERATION OF HYDRAULIC MACHINE

BACKGROUND OF THE INVENTION

The present invention relates to an apparatus for controlling the operation of a hydraulic machine of the type having a plurality of runners mounted on a common shaft and movable flow-rate adjusting vanes provided around respective runners. More particularly, the invention is concerned with an apparatus for controlling the operation of a hydraulic machine of the type mentioned above in such a manner as to control the opening of the flow-rate adjusting vanes to provide a constant output of the machine.

Generally, hydraulic machines are intended for utilization of potential energy and kinetic energy of water or to send the water to a place demanding the water supply. Typical examples of such hydraulic machines are water wheels in hydraulic power station and pumps.

Pumping-up power stations are becoming popular in order to meet the peak of demand for electric power. The head of the pumping-up water stations built in recent years is becoming greater, which in turn gives a rise to a demand for multi-stage turbines. The multi-stage pump turbine consists of a plurality of pump turbines, i.e. a plurality of runners mounted on a common shaft and movable flow-rate adjusting vanes (referred to as guide vanes, hereinunder) disposed around respective runners.

The plurality of runners of the multi-stage pump turbine are so designed as to share equal or proportional parts of the total head or lift. Thus such multi-stage pump turbine is designed such that a flow rate-head (or lift) characteristics at each stage are equal to one another or are related to one another in predetermined ratios.

In the operation of the multi-stage pump turbine, it is necessary that the guide vanes of all stages are controlled in synchronism such that each runner shares an equal or a proportional part of the total head.

The conventional apparatus for controlling the operation of this multi-stage pump turbine includes two governors when the number of stages is two, and three governors when the number of stages is three, in contrast to the controlling apparatus for a single-stage machine which requires only one governor. In this conventional control apparatus having a plurality of governors, the respective governors separately receive the revolving speed signal from a generator motor connected to the multi-stage pump. As a matter of fact, however, a slight fluctuation in performances of the governors is inevitable mainly for the reasons related to the production. It is, therefore, extremely difficult to attain a perfect synchronization of opening and closing operation of guide vanes of all stages. The use of a plurality of governors for a single multi-stage pump turbine raises the production cost and, in addition, impractically complicates the control system due to an increase of the number of the controlled elements, to deteriorate the reliability seriously.

On the other hand, it has been attempted to control the guide vanes of all stages by a single governor. This attempt, however, cannot make the stages share proportional parts of total head while it can be suitably applied to the control in which the stages share equal parts of the total head.

SUMMARY OF THE INVENTION

Accordingly, an object of the invention is to provide an apparatus for controlling the operation of hydraulic machines, capable of overcoming the above-described problems of the prior art.

Another object of the invention is to provide an apparatus for controlling the operation of hydraulic machines, which can be produced at a low production cost and which has a reduced number of controlling elements to ensure a high reliability of control.

Still another object of the invention is to provide an apparatus for controlling the operation of a multi-stage pump turbine in such a manner that the runners of all stages share equal parts or proportional parts of the total head.

A further object of the invention is to provide a method of controlling the operation of multi-stage pump turbine which can make a synchronous control of all stages such that the runners of the respective stages share equal parts or proportional parts of the total head.

To these ends, according to the invention, the opening and closing of the guide vanes around the runner of any selected stage is controlled independently while the opening and closing of the guide vanes around the runners of other stages are controlled subordinately such that the opening degree of guide vanes of other stages are held in a predetermined relation to the opening degree of the guide vanes of the selected stage.

DESCRIPTION OF THE PREFERRED EMBODIMENTS

Figure 1:
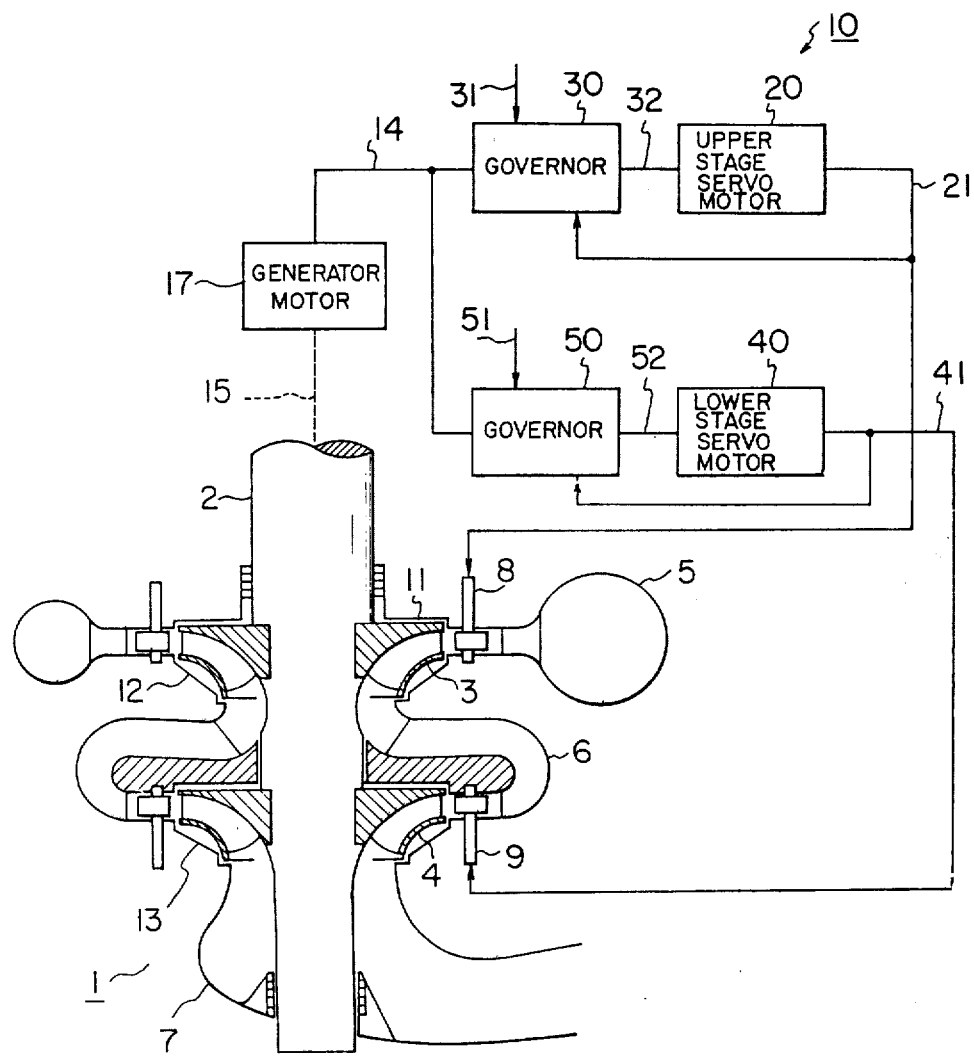
FIG. 1 is a schematic illustration of a conventional operation controlling apparatus for a two-stage pump turbine.

Referring first to FIG. 1, there is shown schematically a conventional operation controlling apparatus 10 associated with a hydraulic machine which is, for example, a two-stage pump turbine. The two-stage pump turbine 1 includes a rotating main shaft 2, two runners 3, 4 mounted on the shaft 1 in two stages, a spiral casing 5 arranged around the runner 3 of the upper stage, a return guide 6 disposed around the runner 4 of the lower stage, a draft tube liner 7, an upper stage guide vane 8 provided in the spiral casing 5 and around the runner 3 of the upper stage, and a lower stage guide vane 9 provided in the return guide 6 and disposed around the lower stage runner 4.

The draft tube liner 7 is connected to a lower dam (not shown), while the spiral casing 5 is connected to an upper dam (not shown) through a pipe which is also omitted from the drawings. The upper part 11 of the upper stage cover covers the upper stage runner 3 and is connected to the spiral casing 5. The lower part 12 of the upper stage cover interconnects the spiral casing 5 and a return guide 6. The lower part 13 of a lower stage cover interconnects the return guide 6 and the draft tube liner 7.

When the two-stage pump turbine 1 operates as a turbine, the water coming from the upper dam is introduced to the upper stage runner 3 through a penstock, spiral casing 5 and the upper stage guide vane 8. The flow of water discharged from the upper stage runner is settled by the return guide 6 and introduced to the lower stage runner 4 through the lower stage guide vane 9. The water coming out of the lower stage runner 4 is discharged to the lower dam (not shown) through the draft tube liner 7.

The conventional controlling apparatus 10, adapted for simultaneously controlling both of the guide vanes of the upper and lower stages, includes an upper stage servo motor 20 for controlling the upper stage guide vanes 8, a controller 30 (referred to as "upper stage governor", hereinunder) for controlling the servo motor 20, a lower stage servo motor 40 for controlling the lower stage guide vanes 9, and a controller 50 (referred to as "lower stage governor", hereinunder) for controlling the servo motor 40. A generator motor 17 connected to the turbine output 15 by the shaft 2 serves as a revolving speed detecting means and produces a revolving speed signal 14 which is delivered to the governors 30, 50 of the upper and lower stages. As will be seen from FIG. 2, the governors 30 and 50 are adapted to compare the speed signal 14 with an upper stage revolving speed command 31 and a lower stage revolving speed command 51 and to deliver to the servo motors 20, 40 of the upper and lower stages instruction signals 32 and 52 in accordance with the revolving speed deviation signals $S_{11}$ and $S_{12}$ obtained as a result of the comparison, thereby to make the actual revolving speed of the shaft correspond with the revolving speed command. In consequence, the servo motors 20 and 40 of the upper and lower stages are operated to deliver stroke signals 21 and 41 to the upper stage guide vanes 8 and lower stage guide vanes 9, respectively.

Figure 2:
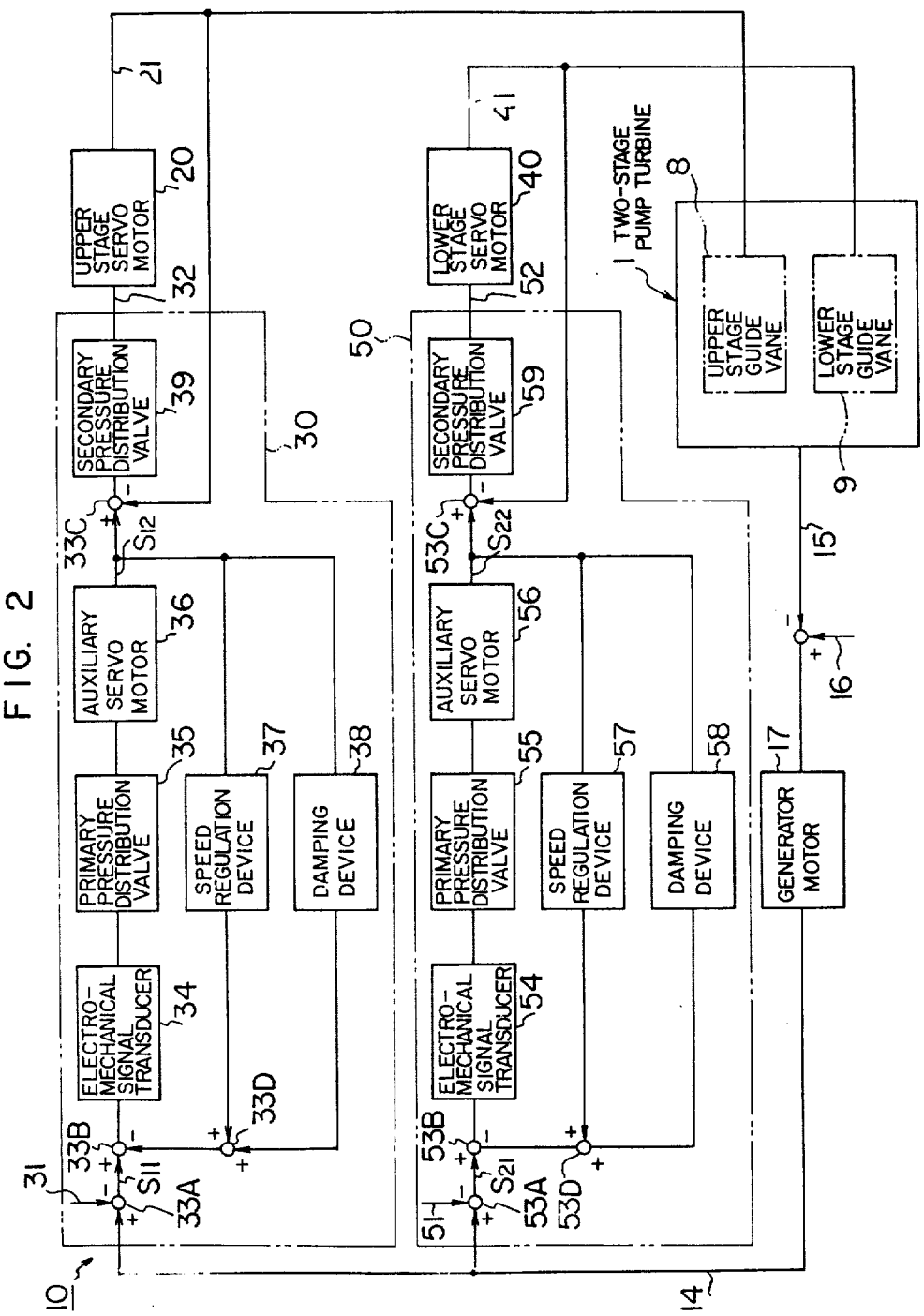
FIG. 2 is a block diagram of the apparatus shown in FIG. 1.

As will be seen from FIG. 2, the output 15 from the pump turbine 1 fluctuates dependent upon the change of load 16 applied by the electric power system, and the sum of the output is supplied to the generator motor 17. The governor 30 adds the revolving speed 14 of the generator motor and the revolving speed command 31 at a summing point 33A to produce a speed deviation signal $S_{11}$. The revolving speed deviation signal $S_{11}$ is delivered through a summing point 33B to an electro mechanical signal transducer 34 so as to be converted into a mechanical signal which is then transmitted to an auxiliary servo motor 36 through a primary pressure distribution valve 35. The signal is then outputted from the servo motor as an output stroke signal $S_{12}$. The output stroke signal $S_{12}$ is delivered to the summing point 33C, speed regulation device 37 and a damping device 38. At the summing point 33C, the output stroke signal $S_{12}$ is added to a servo motor stroke signal 12 explained later, to drive a secondary pressure distribution valve 39 which in turn produces a stroke command output 32. The stroke command output 32 on one hand drives the upper stage servo motor 20 and is transmitted to the upper stage guide vanes 8 as upper stage servo motor stroke signal 21, and, on the other hand, is fed back to the summing point 33C as described above. As described above, the stroke signal $S_{12}$ supplied to the speed regulation device 37 and the damping device 38 is fed back to the electro mechanical signal transducer 34 through the summing points 33D and 33B, to permit the production of such a command signal as to make the speed signal 14 correspond with the upper stage speed command.

The lower stage governor 50 is not described here because it has an identical construction to the upper stage governor 30. It is to be understood, however, that the lower stage governor 50 includes summing points 53A to 53D, electro-mechanical signal transducer 54, primary pressure distribution valve 55, auxiliary servo motor 56, speed regulation device 57, damping device 58 and secondary pressure distribution device 59. The symbol $S_{21}$ represents a speed deviation signal. The symbol $S_{22}$ represents an output stroke signal delivered by the auxiliary servo motor 56.

In the operation of the upper stage governor 30 shown in FIGS. 1 and 2, the revolving speed deviation signal $S_{11}$ is null when the generator motor 17 rotates at the rated speed. However, as the speed is increased, the speed deviation signal $S_{11}$ is produced and delivered to the electro-mechanical transducer 34 which in turn produces a corresponding mechanical signal and delivers the same to the primary pressure distribution valve 35. In consequence, the primary pressure distribution valve 35 operates to actuate the auxiliary servo motor 36 so that the latter produces the stroke signal $S_{12}$ which is fed back to the electro-mechanical signal transducer 34 through the speed regulation device 37 and the damping device 38.

On the other hand, the stroke signal $S_{12}$ activates the secondary pressure distribution valve 39 to actuate the upper stage servo motor 20 so that the latter produces a servo motor stroke signal 21 to drive the guide vanes 8 thereby to reduce the opening degree of the water spout. As the output stroke signal 21 of the servo motor 20 is shifted to the point proportional to the stroke signal $S_{12}$ of the auxiliary servo motor 36, the secondary pressure distribution valve 39 is reset to the neutral position so that the secondary pressure distribution valve 39 stops to operate.

To the contrary, when the revolving speed of the generator motor is lowered, the elements of the control system work to increase the opening degree of the guide vanes 8. The lower stage governor 50 and the lower stage servo motor 40 operate in the same manner as the upper stage governor 30 and the upper stage servo motor 20. It is to be noted here that the runner 3 of the upper stage and the runner 4 of the lower stage are so designed to share halves of the total head and to have a equal flow rate-head characteristics. It is, therefore, essential that the upper stage guide vanes 8 for regulating the flow rate of the water flowing into the runner 3 of upper stage and the lower stage guide vanes 9 for regulating the flow rate of water flowing into the runner 4 of the lower stage have to be controlled perfectly in synchronism, i.e. always to take an equal opening degree.

When this two-stage pump turbine operates as a pump, the runners 3, 4 of the upper and lower stages rotate in the reverse direction to that in the power generating mode, to suck the water from the lower dam and to pump the same up to the upper dam. The share of the head and the flow rate-head characteristics of the upper and lower stage runners are materially identical to those in the power generating mode.

Figure 3:
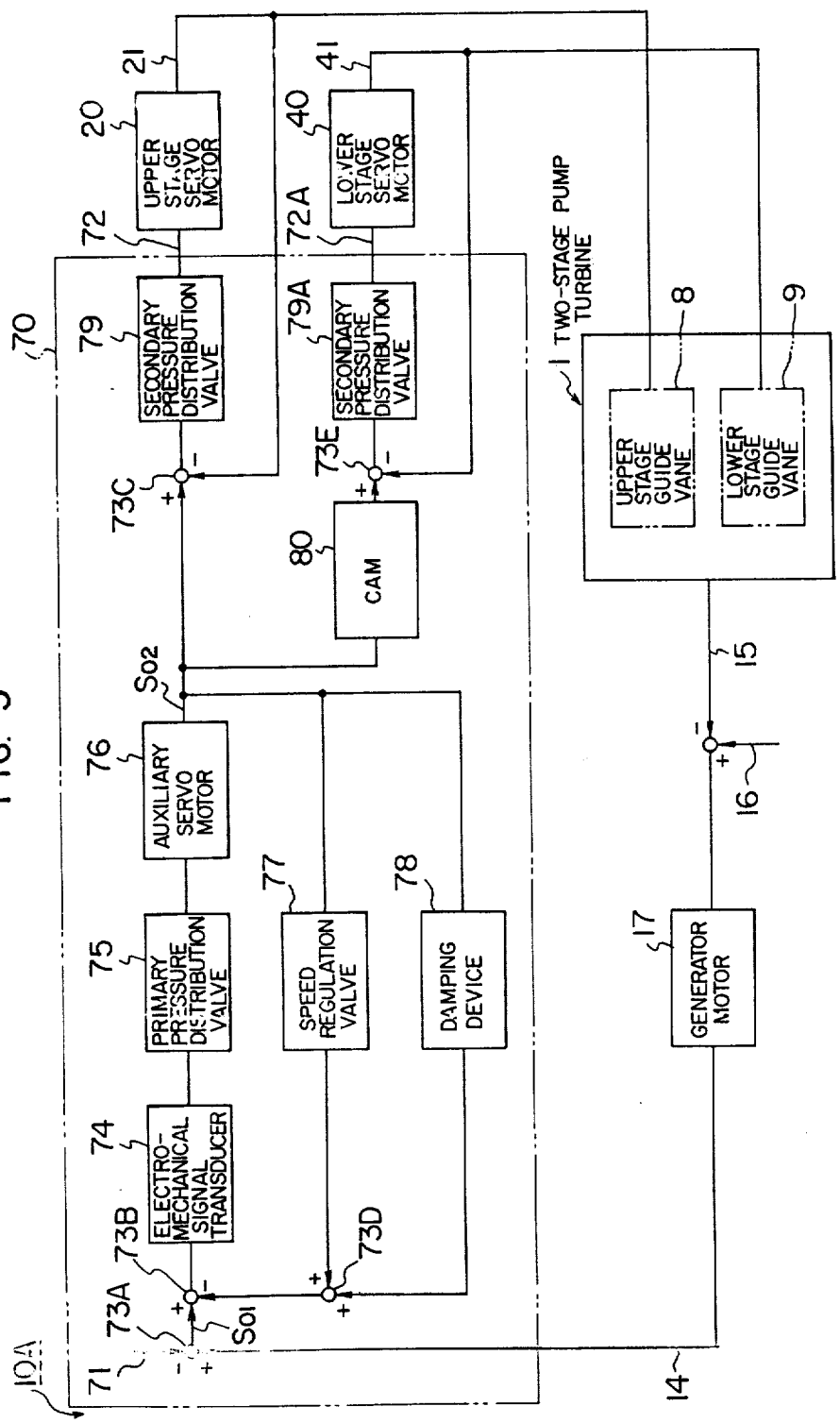
FIG. 3 is a block diagram of an operation controlling apparatus in accordance with a first embodiment of the invention associated with a two-stage pump turbine.

FIG. 3 is a block diagram of an operation controlling apparatus 10A in accordance with an embodiment of the invention, combined with a two-stage pump turbine. In this Figure, the same reference numerals are used to denote the same parts or members as those in FIG. 2. In the operation controlling apparatus 10A shown in FIG. 3, the generator motor 17, serving as speed detection means for detecting the revolving speed of the pump turbine 1, delivers a revolving speed signal 14 to a governor 70. In this governor 70, the speed signal 14 is compared with a revolving speed command 71 at a summing point 73A and a speed deviation signal $S_{01}$ is formed as a result of the comparison. This speed deviation signal $S_{01}$ is delivered through a summing point 73B to an electromechanical signal transducer 74 so as to be changed by the latter into a mechanical signal. This mechanical signal actuates a primary pressure distribution valve 75 thereby to drive an auxiliary servo motor 76 which in turn produces a stroke signal $S_{02}$. This stroke signal $S_{02}$ is then transmitted through a summing point 73C to a secondary pressure distribution valve 79 to produce a command output 72. A servo motor 20 driven by the command output 72 delivers a stroke signal 21 to the guide vanes 8 of the upper stage and feeds back the same to the adding point 73C. The stroke signal $S_{02}$ output from the auxiliary servo motor 76 is delivered is on one hand, fed back to the adding point 73D and, hence, to the summing point 73B through a speed regulation device 77 and a damping device 78 and, on the other hand, supplied through a cam (or lever) 80 and a summing point 73E to a secondary pressure distribution valve 79A to make the latter produce a command output 72A. The command output 72A drives the servo motor 40 and, at the same time, feeds back a stroke signal 41 therefrom to a summing point 73E. Thus, the cam (or a lever) 80 transmits the aforementioned stroke signal $S_{02}$, i.e. the signal representing the opening degree of the guide vanes 8, to the guide vanes 9 of the other stage as an opening command of the guide vanes of the other stage.

When the two-stage pump turbine 1 operates as a turbine, i.e. in the power generating mode, the load 16 from the electric power system is balanced with the output 15 from the two-stage pump turbine during steady-state operation, so that the speed 14 of the generator motor corresponds with the upper stage speed command 71. Assuming here that the load 16 in the electric power system is increased, the speed 14 of the generator motor comes down below the speed command 71 so that an upper stage speed deviation signal $S_{01}$ is produced and delivered to the signal transducer 74 to become a mechanical signal. This mechanical signal drives a plunger (not shown) of the primary pressure distribution valve 75 upwardly so that the upper stage auxiliary servo motor 76 operates in the opening direction through the medium of hydraulic pressure. The stroke signal $S_{02}$ (operation position signal) from the auxiliary servo motor is fed back through the speed regulation device 77 and the damping device 78. Therefore, the auxiliary servo motor 76 stops to operate when the amount of operation thereof comes to be equal to the level of the upper stage speed deviation signal $S_{01}$ to provide the output of the pump turbine matching the load in the electric power system. The upper stage auxiliary servo motor stroke signal $S_{02}$ is delivered to the servo mechanisms 79, 20 which function as a signal amplification mechanism. Namely, the stroke signal $S_{02}$ of the auxiliary servo motor drives the plunger (not shown) of the secondary pressure distribution valve 79 upwardly so that the upper stage servo motor 20 operates in the opening direction through the medium of the hydraulic pressure. Due to the operation of the feedback mechanism, the upper stage servo motor 20 stops to operate when its stroke signal 21 comes to be equal to the level of the stroke signal $S_{02}$ of the upper stage auxiliary servo motor, so that the servo motor 20 takes the position matching the position of the auxiliary servo motor 79 after the change. The upper stage servo motor 20 is connected to the vanes 8 of the upper stage through a guide vane actuating mechanism which is not shown, so that the guide vanes 8 of the upper stage take the position matching the load in the electric power system after the change.

Meanwhile, the stroke signal $S_{02}$ of the upper stage auxiliary servo motor 76 is transmitted to the cam (or lever) 80 which is adapted to maintain the opening of the lower stage guide vanes 9 equal to that of the upper stage guide vanes 8 over the entire region of opening or, alternatively, to vary the opening degree of the lower stage guide vanes 8 in a predetermined relation to the opening of the upper stage guide vanes 8. The signal from the cam 80 is transmitted to the lower stage servo mechanism 79A, 40 serving as a signal amplifier. Namely, the signal from the cam 80 upwardly drives the plunger (not shown) of the lower stage secondary pressure distribution valve 79A so that the lower stage servo motor 40 operates in the opening direction through the medium of the hydraulic pressure. Due to the operation of the feedback mechanism, the lower stage servo motor 40 stops to operate when the stroke signal 41 thereof comes to be equal to the level of the signal from the cam 80. In this state, the position of the lower stage servo motor 40 perfectly corresponds with the position of the upper stage servo motor 20 or is changed in a predetermined relation to the position of the upper stage servo motor 20, in accordance with the contour of the cam 80. The lower stage servo motor 40 is connected to the lower stage guide vanes 9 through a guide vane actuating mechanism which is not shown, so that the opening degree of the lower stage guide vanes 9 perfectly corresponds with that of the upper stage guide vanes 8 or, alternatively, is changed in a predetermined relationship to the opening degree of the upper stage guide vanes 8.

Thus, in the described embodiment of the invention, the upper stage guide vanes 8 are controlled independently of the second stage as in the case of a single-stage pump turbine, in response to the speed (change) signal 14 produced by the generator motor, in accordance with the difference between the output 15 of the two-stage pump turbine 1 and the load 16 in the electric power system, while the lower stage guide vanes 9 are controlled subordinately in accordance with the opening degree of the upper stage guide vanes 8.

When the two-stage pump turbine 1 operates in the pump operation mode, the operation is controlled in the same manner as that in the turbine operation mode, except that the load in the electric power system is substituted by an electric power input from the same and that the generator motor works as a motor.

Figure 4:
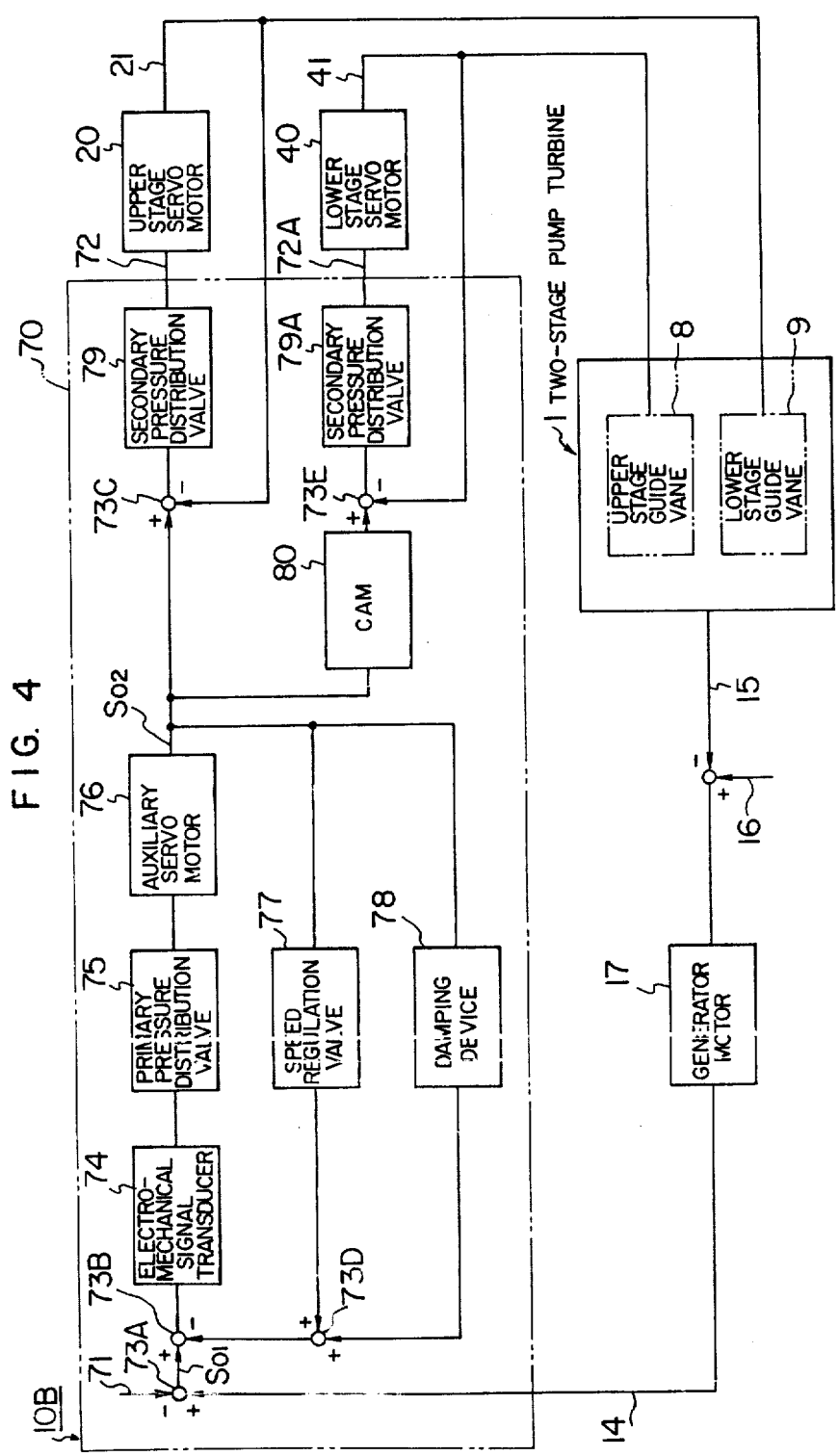
FIG. 4 is a block diagram of an operation controlling apparatus in accordance with a second embodiment of the invention.

FIG. 4 is a block diagram of an operation controlling apparatus 10B in accordance with a second embodiment of the invention combined with a two-stage pump turbine 1. In this embodiment, the servo motors 20 and 40 are connected to the guide vanes 9 and 8, respectively, in contrast to the embodiment shown in FIG. 3. Namely, in the operation controlling apparatus 10B shown in FIG. 4, the lower stage guide vanes 9 are controlled primarily and independently, and the upper stage guide vanes 8 are controlled subordinately in accordance with the opening of the lower stage guide vanes 9.

In the first and second embodiments described hereinabove, all of the controlling elements for controlling the guide vanes 8, 9 of the upper and lower stages, except the servo motors of the upper and lower stages, can advantageously be accommodated by a single cubicle, although two cubicles are used when it is necessary to install the electric system in a separate cubicle.

Thus, the governor system for a two-stage pump turbine, constructed in accordance with an embodiment of the invention, well compared in price to the conventional governor for a single-stage pump turbine. Needless to say, according to the invention, it is possible to attain a remarkable improvement in the reliability because the number of the controlling elements is decreased drastically.

In the case where the pump turbine is so designed that the runners of respective stages share different heads and have different flow rate-head characteristics, it is possible to maintain the desired predetermined relationship between the opening degrees of the upper stage guide vanes 8 and the lower stage guide vanes 9. It is also possible to replace the mechanical signal produced by the cam (or lever) 80 with an electric signal using, for example, broken line characteristics. These modifications are of course within the scope of the present invention.

What is claimed is:

1. A hydraulic machine, comprising:
    a shaft;
    a plurality of annular runners coaxially mounted in axially spaced apart relationship on said shaft;
    means supplying water, guiding the water between the runners, and discharging the water to connect said runners hydraulically in series;
    first movable flow rate adjusting vanes mounted immediately adjacent one of said runners and hydraulically in series between said one runner and another runner;
    second movable flow rate adjusting vanes mounted immediately adjacent said another runner and serially on the side of said another runner opposite from said one runner;
    means for detecting the rotational speed of the hydraulic machine and providing a detected speed signal;
    means for providing a command speed signal;
    means for comparing said detected speed signal with said command speed signal and providing a mechanical stroke signal in accordance with the deviation obtained from the comparison;
    mechanical means drivingly connected to one of said first and second movable flow rate adjusting vanes and directly receiving said mechanical stroke signal for opening and closing said one movable flow rate adjusting vanes for adjusting the flow rate of water through its respective runner and the head across its respective runner;
    second mechanical means, including a mechanical link, for receiving and changing said mechanical stroke signal to a different mechanical stroke signal that differs in accordance with said mechanical link;
    third mechanical means drivingly connected to the other of said movable flow rate adjusting vanes and directly receiving said different mechanical stroke signal for opening and closing said other movable flow rate adjusting vanes for adjusting the flow rate of water through its respective runner and the head across its respective runner, so that said means for providing a command signal and said means for comparing produces only a single mechanical stroke signal that directly controls the adjustment of the vanes for only one runner and the head across the runner while said second and third mechanical means subordinately adjusts the vanes for the other runner and thereby the head across the other runner mechanically in accordance with the mechanical stroke signal for the one runner and in a relationship as determined by said mechanical link.

2. The hydraulic machine according to claim 1, wherein said mechanical link is a cam and cam follower to provide a predetermined mechanical relationship between said first mentioned mechanical stroke signal and said different mechanical stroke signal.

3. The hydraulic machine according to claim 2, wherein said cam and cam follower are so constructed that the mechanical ratio between said mechanical stroke signal and said different mechanical stroke signal varies in a fixed relation in accordance with the mechanical stroke signal.

4. The hydraulic machine according to claim 3, in combination with an electric generator drivingly connected to said hydraulic machine and in an electrical power system; said hydraulic machine being a water pump/turbine; means responsive to the electrical power system to provide an electric power input signal and compares that electric power input signal with said detected speed signal to provide a changed detected speed signal that is provided to said means for comparing.

5. The hydraulic machine according to claim 4, including additional runners drivingly mounted on said shaft in hydraulic series with said first mentioned runners; additional movable flow rate adjusting vanes respectively for said additional runners; additional mechanical means, each including a mechanical link, for receiving said mechanical stroke signal and producing a different mechanical stroke signal that differs in accordance with said mechanical link; and additional mechanical means drivingly connected to the additional movable flow rate adjusting vanes, respectively, and directly receiving respective additional mechanical stroke signals for opening and closing the respective movable flow rate adjusting vanes for adjusting the flow rate of water through its respective runner and the head across its respective runner, so that said means for providing a command signal and said means for comparing produces only a single mechanical stroke signal that directly controls the adjustment of the vanes for only one runner and the head across the one runner while subordinately adjusting the vanes for all of the other runners and thereby the head across the other runners mechanically in accordance with the mechanical stroke signal for the one runner and in a relationship as determined by said mechanical link.

6. The hydraulic machine according to claim 2, including additional runners drivingly mounted on said shaft in hydraulic series with said first mentioned runners; additional movable flow rate adjusting vanes respectively for said additional runners; additional mechanical means, each including a mechanical link, for receiving said mechanical stroke signal and producing a different mechanical stroke signal that differs in accordance with said mechanical link; and additional mechanical means drivingly connected to the additional movable flow rate adjusting vanes, respectively, and directly receiving respective additional mechanical stroke signals for opening and closing the respective movable flow rate adjusting vanes for adjusting the flow rate of water through its respective runner and the head across its respective runner, so that said means for providing a command signal and said means for comparing produces only a single mechanical stroke signal that directly controls the adjustment of the vanes for only one runner and the head across the one runner while subordinately adjusting the vanes for all of the other runners and thereby the head across the other runners mechanically in accordance with the mechanical stroke signal for the one runner and in a relationship as determined by said mechanical link.

7. The hydraulic machine according to claim 6, wherein said cam and cam follower are so constructed that the mechanical ratio between said mechanical stroke signal and said different mechanical stroke signal varies in a fixed relation in accordance with the mechanical stroke signal.

8. The hydraulic machine according to claim 6, in combination with an electric generator drivingly connected to said hydraulic machine and in an electrical power system; said hydraulic machine being a water pump/turbine; means responsive to the electrical power system to provide an electric power input signal and compares that electric power input signal with said detected speed signal to provide a changed detected speed signal that is provided to said means for comparing.

9. The hydraulic machine according to claim 2, in combination with an electric generator drivingly connected to said hydraulic machine and in an electrical power system; said hydraulic machine being a water pump/turbine; means responsibe to the electrical power system to provide an electric power input signal and compares that electric power input signal with said detected speed signal to provide a changed detected speed signal that is provided to said means for comparing.

10. The hydraulic machine according to claim 1, where said mechanical link is a lever and lever follower to provide a predetermined mechanical relationship between said first mentioned mechanical stroke signal and said different mechanical stroke signal.

11. The hydraulic machine according to claim 10, wherein said lever and lever follower are so constructed that the mechanical ratio between said mechanical stroke signal and said different mechanical stroke signal in a fixed relation in accordance with the mechanical stroke signal.

12. The hydraulic machine according to claim 11, in combination with an electric generator drivingly connected to said hydraulic machine and in an electrical power system; said hydraulic machine being a water pump/turbine; means responsive to the electrical power system to provide an electric power input signal and compares that electrical power input signal with said detected speed signal to provide a changed detected speed signal that is provided to said means for comparing.

13. The hydraulic machine according to claim 12, including additional runners drivingly mounted on said shaft in hydraulic series with said first mentioned runners; additional movable flow rate adjusting vanes respectively for said additional runners; additional mechanical means, each including a mechanical link, for receiving said mechanical stroke signal and producing a different mechanical stroke signal that differs in accordance with said mechanical link; and additional mechanical means drivingly connected to the additional movable flow rate adjusting vanes, respectively, and directly receiving respective additional mechanical stroke signals for opening and closing the respective movable flow rate adjusting vanes for adjusting the flow rate of water through its respective runner and the head across its respective runner, so that said means for providing a command signal and said means for comparing produces only a single mechanical stroke signal that directly controls the adjustment of the vanes for only one runner and the head across the one runner while subordinately adjusting the vanes for all of the other runners and thereby the head across the other runners mechanically in accordance with the mechanical stroke signal for the one runner and in a relationship as determined by said mechanical link.

14. The hydraulic machine according to claim 12, in combination with an electric generator drivingly connected to said hydraulic machine and in an electrical power system; said hydraulic machine being a water pump/turbine; means responsive to the electrical power system to provide an electric power input signal and compares the electric power input signal with said detected speed signal to provide a changed detected speed signal that is provided to said means for comparing.

15. The hydraulic machine according to claim 10, including additional runners drivingly mounted on said shaft in hydraulic series with said first mentioned runners; additional movable flow rate adjusting vanes respectively for said additional runners; additional mechanical means, each including a mechanical link, for receiving said mechanical stroke signal and producing a different mechanical stroke signal that differs in accordance with said mechanical link; and additional mechanical means drivingly connected to the additional movable flow rate adjusting vanes, respectively, and directly receiving respective additional mechanical stroke signals for opening and closing the respective movable flow rate adjusting vanes for adjusting the flow rate of water through its respective runner and the head across its respective runner, so that said means for providing a command signal and said means for comparing produces only a single mechanical stroke signal that directly controls the adjustment of the vanes for only one runner and the head across the one runner while subordinately adjusting the vanes for all of the other runners and thereby the head across the other runners mechanically in accordance with the mechanical stroke signal for the one runner and in a relationship as determined by said mechanical link.

16. The hydraulic machine according to claim 15, wherein said lever and lever follower are so constructed that the mechanical ratio between said mechanical stroke signal and said different mechanical stroke signal in a fixed relation in accordance with the mechanical stroke signal.

17. The hydraulic machine according to claim 15, in combination with an electric generator drivingly connected to said hydraulic machine and in an electrical power system; said hydraulic machine being a water pump/turbine; means responsive to the electrical power system to provide an electric power input signal and compares that electric power input signal with said detected speed signal to provide a changed detected speed signal that is provided to said means for comparing.

18. A hydraulic machine, comprising:
a shaft;
a plurality of annular runners coaxially mounted in axially spaced apart relationship on said shaft;
means supplying water, guiding the water between the runners, and discharging the water to connect said runners hydraulically in series;
first movable flow rate adjusting vanes mounted immediately adjacent one of said runners and hydraulically in series between said one runner and another runner;
second movable flow rate adjusting vanes mounted immediately adjacent said another runner and serially on the side of said another runner opposite from said one runner;
means for detecting the rotational speed of the hydraulic machine and providing a detected speed signal;
means for providing a command speed signal;
means for comparing said detected speed signal with said command speed signal and providing an electrical stroke signal in accordance with the deviation obtained from the comparison;
mechanical means drivingly connected to one of said first and second movable flow rate adjusting vanes and directly receiving said electrical stroke signal for opening and closing said one movable flow rate adjusting vanes for adjusting the flow rate of water through its respective runner and the head across its respective runner;
electrical means for receiving and changing said electrical stroke signal to a different electrical stroke signal that differs in accordance with a predetermined relationship; and
additional mechanical means drivingly connected to the other of said movable flow rate adjusting vanes and directly receiving said different electrical stroke signal for opening and closing said other movable flow rate adjusting vanes for adjusting the flow rate of water through its respective runner and the head across its respective runner, so that said means for providing a command signal and said means for comparing produces only a single electrical stroke signal that directly controls the adjustment of the vanes for only one runner and the head across the runner while said electrical means and additional mechanical means subordinately adjusts the vanes for the other runner and thereby the head across the other runner in accordance with the electrical stroke signal for the one runner and in a relationship as determined by said electrical means.

19. The hydraulic machine according to claim 18, including additional runners drivingly mounted on said shaft in hydraulic series with said first mentioned runners; additional movable flow rate adjusting vanes respectively for said additional runners; additional mechanical means, each including a mechanical link, for receiving said mechanical stroke signal and producing a different mechanical stroke signal that differs in accordance with said mechanical link; and additional mechanical means drivingly connected to the additional movable flow rate adjusting vanes, respectively, and directly receiving respective additional mechanical stroke signals for opening and closing the respective movable flow rate adjusting vanes for adjusting the flow rate of water through its respective runner and the head across its respective runner, so that said means for providing a command signal and said means for comparing produces only a single mechanical stroke signal that directly controls the adjustment of the vanes for only one runner and the head across the one runner while subordinately adjusting the vanes for all of the other runners and thereby the head across the other runners mechanically in accordance with the mechanical stroke signal for the one runner and in a relationship as determined by said mechanical link.

20. The hydraulic machine according to claim 19, in combination with an electric generator drivingly connected to said hydraulic machine and in an electrical power system; said hydraulic machine being a water pump/turbine; means responsive to the electrical power system to provide an electric power input signal and compares that electric power input signal with said detected speed signal to provide a changed detected speed signal that is provided to said means for comparing.

21. The hydraulic machine according to claim 18, in combination with an electric generator drivingly connected to said hydraulic machine and in an electrical power system; said hydraulic machine being a water pump/turbine; means responsive to the electrical power system to provide an electric power input signal and compares that electric power input signal with said detected speed signal to provide a changed detected speed signal that is provided to said means for comparing.

22. A method of controlling a hydraulic machine, comprising the steps of:
supplying water to a plurality of annular runners coaxially mounted in axially spaced relationship on a single shaft of the hydraulic machine, guiding the supplied water serially through the runners and discharging the water from the hydraulic machines;
moving first flow rate adjusting vanes mounted immediately adjacent one of the runners and hydraulically in series between one runner and another runner to control the flow rate through and head across said one runner;
moving second movable flow rate adjusting vanes mounted immediately adjacent another runner and serially on the side of the another runner opposite from the one runner to adjust the flow rate through and head across the another runner;
detecting the rotational speed of the hydraulic machine and providing a corresponding detected speed signal;
providing a command speed signal;
comparing the detected speed signal with the command speed signal and providing a single stroke signal in accordance with the deviation obtained from the comparison;
mechanically driving one of said first and second movable flow rate adjusting means in accordance with said stroke signal for correspondly opening and closing the one movable flow rate adjusting vanes for adjusting the flow rate of water through its respective runner and the head across its respective runner in accordance with the stroke signal;
means for receiving the stroke signal and changing the stroke signal in a predetermined relationship to produce a different correlated stroke signal;

mechanically driving the movable flow rate adjusting vanes in accordance with the different stroke signal for opening and closing the other movable flow rate adjusting vanes for adjusting the flow rate of water through its respective runner and the head across its respective runner, so that only a single command is compared with the speed signal to produce only a single stroke signal that is used for directly controlling the adjustment of the vanes of only one runner and the head across the runner while subordinately adjusting the vanes of the other runner in accordance with a different stroke signal in a predetermined relationship with the first mentioned stroke signal.

23. The method according to claim 22 applied to a pump/turbine, and including the steps of drivingly connecting the pump/turbine to a generator electrically connected to a power system, and modifying the detected speed signal with the electrical power input signal from the electrical power system.

24. The method according to claim 23, including providing said stroke signal as a mechanical stroke signal and producing the different stroke signal as a mechanical signal directly from the first mentioned stroke signal through a mechanical link having a predetermined mechanical relationship between the first mentioned stroke signal and the different stroke signal.

25. The method according to claim 22, including providing said stroke signal as a mechanical stroke signal and producing the different stroke signal as a mechanical signal directly from the first mentioned stroke signal through a mechanical link having a predetermined mechanical relationship between the first mentioned stroke signal and the different stroke signal.

26. The method according to claim 25, including varying the ratio between the first mentioned stroke signal and a different stroke signal mechanically in accordance with the first mentioned stroke signal.

27. The method according to claim 25, applied to a pump/turbine, and including the steps of drivingly connecting the pump/turbine to a generator electrically connected to a power system, and modifying the detected speed signal with the electrical power input signal from the electrical power system.

* * * * *